United States Patent
Fildebrandt et al.

(10) Patent No.: US 7,757,204 B2
(45) Date of Patent: Jul. 13, 2010

(54) LIMITING EXTENSIBILITY OF A VISUAL MODELING LANGUAGE

(75) Inventors: Ulf Fildebrandt, Oftersheim (DE); Frank E. Seeger, Wiesloch (DE); Yuval Gilboa, Pardeslya (IL)

(73) Assignee: SAP AG, Walldor (DE)

( * ) Notice: Subject to any disclaimer, the term of this patent is extended or adjusted under 35 U.S.C. 154(b) by 1160 days.

(21) Appl. No.: 11/323,393

(22) Filed: Dec. 29, 2005

(65) Prior Publication Data

US 2007/0157159 A1 Jul. 5, 2007

(51) Int. Cl.
G06F 9/44 (2006.01)

(52) U.S. Cl. ..................................... 717/104

(58) Field of Classification Search .......... 717/104–106
See application file for complete search history.

(56) References Cited

U.S. PATENT DOCUMENTS

| | | | |
|---|---|---|---|
| 5,446,846 | A | 8/1995 | Lennartsson |
| 6,049,822 | A | 4/2000 | Mittal |
| 6,230,309 | B1 | 5/2001 | Turner et al. |
| 6,247,174 | B1 | 6/2001 | Santhanam et al. |
| 6,407,761 | B1 | 6/2002 | Ching et al. |
| 6,429,880 | B2 | 8/2002 | Marcos et al. |
| 6,476,828 | B1 | 11/2002 | Burkett et al. |
| 6,898,794 | B2 | 5/2005 | Babutzka et al. |
| 7,043,693 | B2 | 5/2006 | Wenzel et al. |
| 7,127,328 | B2 | 10/2006 | Ransom |
| 7,412,658 | B2 | 8/2008 | Gilboa |
| 7,463,263 | B2 | 12/2008 | Gilboa |
| 2001/0045963 | A1 | 11/2001 | Marcos et al. |
| 2002/0091990 | A1* | 7/2002 | Little et al. .................. 717/105 |
| 2002/0104068 | A1* | 8/2002 | Barrett et al. ................ 717/104 |
| 2002/0147606 | A1* | 10/2002 | Hoffmann et al. ............... 705/1 |
| 2003/0167455 | A1* | 9/2003 | Iborra et al. ................. 717/105 |
| 2003/0202014 | A1 | 10/2003 | Wood |
| 2004/0044729 | A1* | 3/2004 | Foerg et al. .................. 709/203 |
| 2004/0148586 | A1* | 7/2004 | Gilboa ........................ 717/108 |

(Continued)

FOREIGN PATENT DOCUMENTS

WO 01/77822 A2 10/2001

OTHER PUBLICATIONS

Ayers, Larry, "A Beginner's Guide to Compiling Source Code," http://www.linuxjournal.com/article/0216.1996.

(Continued)

*Primary Examiner*—Anna Deng
(74) *Attorney, Agent, or Firm*—Fountainhead Law Group P.C.

(57) ABSTRACT

Methods and apparatus, including computer program products, for selectively supporting extensions to a modeling language. A method includes receiving a request to extend a modeling language entity and selectively providing support to define an extension of the modeling language entity. Support is selectively provided by determining whether the support to define the extension of the modeling language entity can be provided based on a definition of the modeling language entity in a visual modeling language. If the support can be provided, the support is provided; otherwise, the support is excluded. The method can further include selectively generating the extended modeling language entity. The extended modeling language entity can be selectively generated by determining whether the extension meets one or more conditions for being a valid extension to the modeling language entity, and if the extension meets the conditions, the extended modeling language entity is generated.

30 Claims, 6 Drawing Sheets

U.S. PATENT DOCUMENTS

| | | | |
|---|---|---|---|
| 2005/0203951 A1* | 9/2005 | Schroeder et al. | 707/103 Z |
| 2005/0257157 A1 | 11/2005 | Gilboa et al. | |
| 2005/0261884 A1 | 11/2005 | Sakamoto et al. | |
| 2006/0004845 A1* | 1/2006 | Kristiansen et al. | 707/103 R |
| 2006/0036479 A1* | 2/2006 | Whitmore | 705/10 |
| 2006/0047789 A1 | 3/2006 | Kumar et al. | |
| 2006/0064667 A1* | 3/2006 | Freitas | 717/104 |
| 2006/0168278 A1 | 7/2006 | Lazen et al. | |
| 2006/0206864 A1* | 9/2006 | Shenfield et al. | 717/107 |
| 2006/0206890 A1* | 9/2006 | Shenfield et al. | 717/174 |
| 2007/0022394 A1* | 1/2007 | Ghosh et al. | 716/5 |
| 2007/0038609 A1 | 2/2007 | Wu | |
| 2007/0094609 A1 | 4/2007 | Gilboa et al. | |
| 2007/0157159 A1 | 7/2007 | Fildebrandt et al. | |
| 2007/0168383 A1 | 7/2007 | Fildebrandt et al. | |
| 2007/0168384 A1 | 7/2007 | Fildebrandt et al. | |
| 2007/0213972 A1 | 9/2007 | Schejter et al. | |
| 2007/0239717 A1* | 10/2007 | Thrash et al. | 707/7 |
| 2009/0006992 A1* | 1/2009 | Gilboa | 715/763 |
| 2009/0007062 A1 | 1/2009 | Gilboa | |
| 2009/0172695 A1 | 7/2009 | Lazaroff et al. | |

OTHER PUBLICATIONS

Verio—"Logging into your Server from FrontPage," http://www.verio.com/support/documents/view_article.cfm?docid=3703. 2006.

Fitzloff, Emily, Gardner, Dana, "Web Open Enterprise Portals," http://www.infoworld.com/cgi-bin/displayStory.pl?/features/990125eip.htm Jan. 25, 1999.

"ABAP," http://www.wikipedia.org/wiki/ABAP Apr. 2007.

"RFC," http://en.wikipedia.org/wiki/Remote_function_call Mar. 2007.

"XML," http://en.wikipedia.org/wiki/Xml Mar. 2007.

"Canonical," http:/dictionary.reference.com/browse/canonical 2000.

U.S. Appl. No. 12/613,250, filed Nov. 11, 2009, Gilboa.

Abrams et al., "UIML: An Appliance-Independent XML User Interface Language". Computer Networks (1999). vol. 31, No. 11-16, pp. 1695-1708.

Ceri, Stefano et al., "Web Modeling Language (WebML): A Modeling Language for Designing Web Sites," Computer Networks (2000). vol. 33, pp. 137-157.

Callahan, Evan, "Microsoft Access 2000: Visual Basic Applications Fundamentals," Microsoft Press, 1999.

Microsoft Computer Dictionary, 5th Ed., Microsoft Press, 2002.

Nora Koch and Andreas Kraus, "The Expressive Power of UML-based Web Engineering", May 2002, Ludwig-Maximilians-University Munchen. Germany, 15 pages.

* cited by examiner

FIG. 1

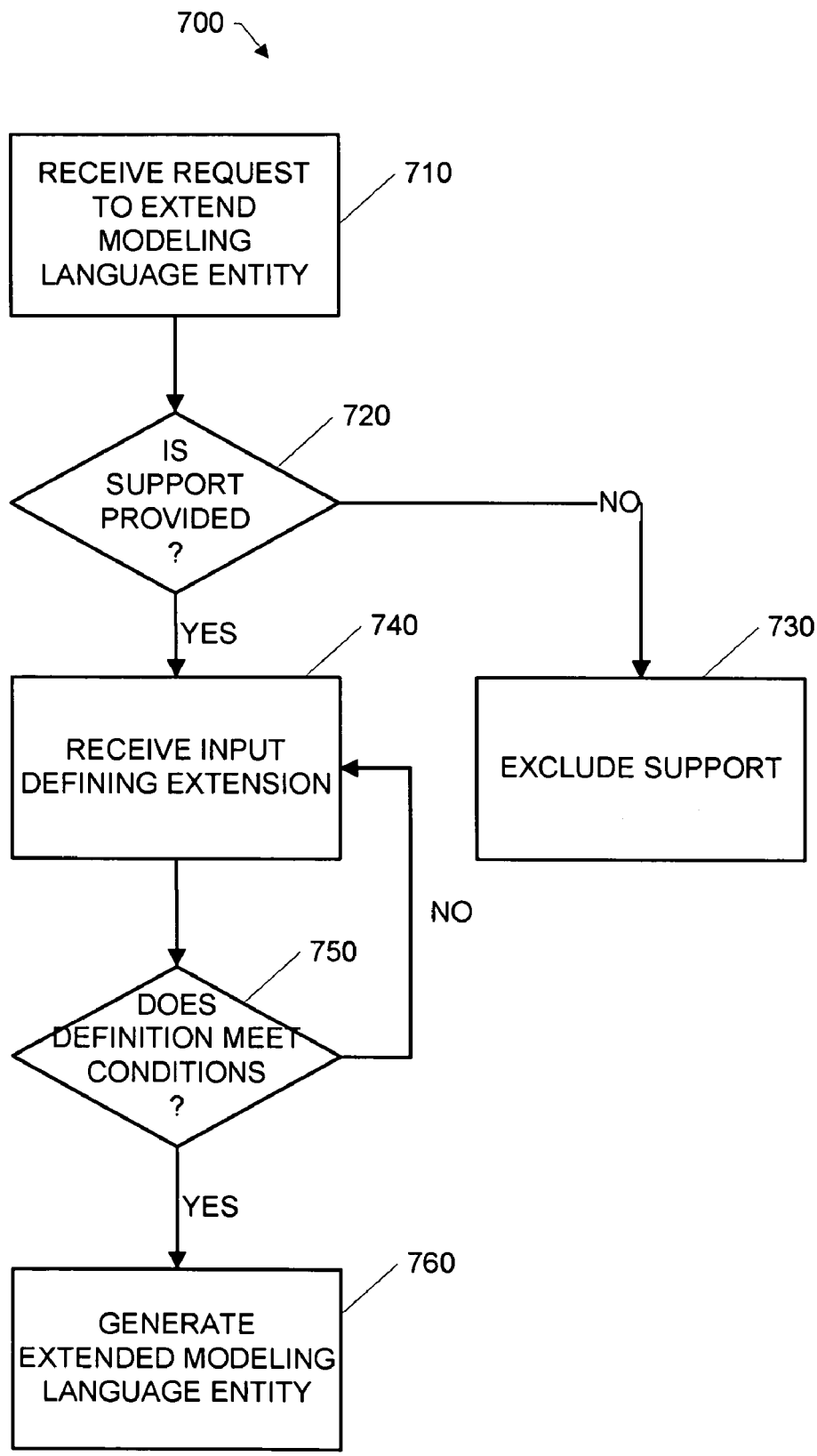

LIMITING EXTENSIBILITY OF A VISUAL MODELING LANGUAGE

BACKGROUND

The present disclosure relates to data processing by a digital computer in a visual modeling environment, and more particularly to limiting extensions to a visual modeling language.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as Visual Composer, which is a visual modeling program manufactured by SAP AG of Walldorf (Baden), Germany (SAP). A tool like Visual Composer allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the Java programming language from Sun Microsystems, Inc. of Santa Clara, Calif.). A runtime version of an application can be generated by a visual modeling program based on a designtime version of the application, with the use of a model underlying the designtime version of the application. For example, a designtime version of an application can be used to devise a model with Java classes, and, the Java classes can be compiled to generate a Java runtime version of an application.

The modeling language of a visual modeling program can be defined in the visual modeling language environment using various development tools, such as a text editor and modeling language entity generation tools (e.g., a compiler), which can be integrated into an integrated development environment. Defining the modeling language can include defining modeling language entities, corresponding designtime entities, and corresponding runtime entities.

SUMMARY

The present disclosure provides methods and apparatus, including computer program products, that implement techniques for generating extended modeling language entities.

In one general aspect, the techniques feature a method that includes receiving a request to extend a modeling language entity; selectively providing support to define an extension of the modeling language entity; and, if support is provided, receiving input defining the extension, receiving a request to generate an extended modeling language entity, and selectively generating the extended modeling language entity. Support is selectively provided by determining whether the support to define the extension of the modeling language entity can be provided based on a definition of the modeling language entity in a visual modeling language, and if the support can be provided, providing the support. Otherwise, the support is excluded. The extended modeling language entity is selectively generated by determining whether the extension meets one or more conditions for being an extension to the modeling language entity, and if the extension meets the conditions, generating the extended modeling language entity. Otherwise the request to generate the extended modeling language entity is denied. The extended modeling language entity is defined in accordance with the extension and the modeling language entity.

Implementations can include one or more of the following advantageous features. Types of modeling language entities for which support can be provided include scenarios that represent a reusable interface unit of an application, interactors that transform input data into output data, and services that provide data. The conditions can include a first one or more conditions defining elements of a runtime entity, where the conditions are required to be implemented and the runtime entity corresponds to the modeling language entity.

An architecture of a modeling environment of a visual modeling program can include a first layer defining a technical platform, a second layer defining a framework for implementing the modeling language in the technical platform, a third layer defining designtime interfaces for modeling language entities, and a fourth layer defining a layer for configuring modeling language entities, where the support can be selectively provided in the third layer.

Selectively providing support and selectively generating an extended modeling language entity can be performed in an integrated development environment.

The request to extend a modeling language entity, the input defining the extension, and the request to generate an extended modeling language entity can be received as a single submission of input at a development tool (e.g., as a submission of a definition of an extension).

The extension can define syntax, semantics, or both of the extended modeling language entity.

In another aspect, a method includes receiving a request to extend a modeling language entity and selectively providing support to define an extension of the modeling language entity. Support is selectively provided by determining whether the support to define the extension of the modeling language entity can be provided based on a definition of the modeling language entity in a visual modeling language. If the support can be provided, the support is provided; otherwise, the support is excluded.

In another aspect, a method includes receiving input defining an extension of a modeling language entity in a visual modeling language, receiving a request to generate an extended modeling language entity, and selectively generating the extended modeling language entity. The extended modeling language entity can be selectively generated by determining whether the extension meets one or more conditions for being a valid extension to the modeling language entity, and if the extension meets the conditions, generating the extended modeling language entity. Otherwise, the request to generate the extended modeling language entity is declined. The extended modeling language entity is defined in accordance with the extension and the modeling language entity.

In another aspect, a method includes receiving a request to extend a modeling language entity and determining whether support to define an extension of the modeling language entity is to be provided. If support is to be provided to the modeling language entity, the support is provided, including receiving input defining the extension, receiving a request to generate an extended modeling language entity, determining whether the extension meets one or more conditions for being an extension to the modeling language entity, and generating the extended modeling language entity if the extension meets the conditions. If the support is not to be provided, the support is excluded. Determining whether to support the modeling language entity is based on a definition of the modeling language entity in a visual modeling language (e.g., analyzing the definition of the modeling language entity). If the extension does not meet the conditions, the request to generate the extended modeling language entity is denied.

Other aspects can include, computer program products, tangibly embodied in information carriers, that are operable to cause data processing apparatus to perform operations similar to those of the methods described above, and a system that includes modeling language definition means for defining a modeling language and modeling language editing means for selectively supporting extensions of the modeling language and selectively generating the extensions.

The subject matter disclosed in this specification can be implemented to realize one or more of the following advantages.

Extensibility of modeling language elements of a modeling language can be limited. Limitations can be defined in the modeling language and a mechanism, such as a component of an integrated development environment, can enforce limitations. Thus, a user of, for example, an integrated development environment, need not be intimately familiar with a modeling language when attempting to extend modeling language entities in accordance with a modeling language, as the extensibility of the modeling language is enforced for the user. For example, an integrated development environment can allow a user to extend certain modeling language entities while preventing the user from extending other modeling language entities.

A mechanism, such as a component of an integrated development environment, can require that certain elements relating to a modeling language entity be implemented for an extension. Advantageously, the mechanism can prevent extensions from being generated where the extensions have not been fully implemented. Thus, a development environment can ensure that extensions are properly implemented. Also, a user need not be concerned with forgetting to implement aspects of an extension that need to be implemented, as the development environment can prevent the user from forgetting to implement aspects and, in some implementations, the development environment can notify a user of aspects that need to be implemented.

By limiting a way in which modeling entities are extended, user interface and branding guidelines and principles can be enforced to ensure that the generated applications are consistent and conform with proven user interface principles (e.g., user interface design principles for coherence) and are thus easier to use by end-users.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1 is a screenshot of a user interface.

FIG. 7 is a flowchart illustrating a process of selectively generating an extended modeling language entity.

Like reference numbers and designations in the various drawings indicate like elements.

DETAILED DESCRIPTION

Figure 1:
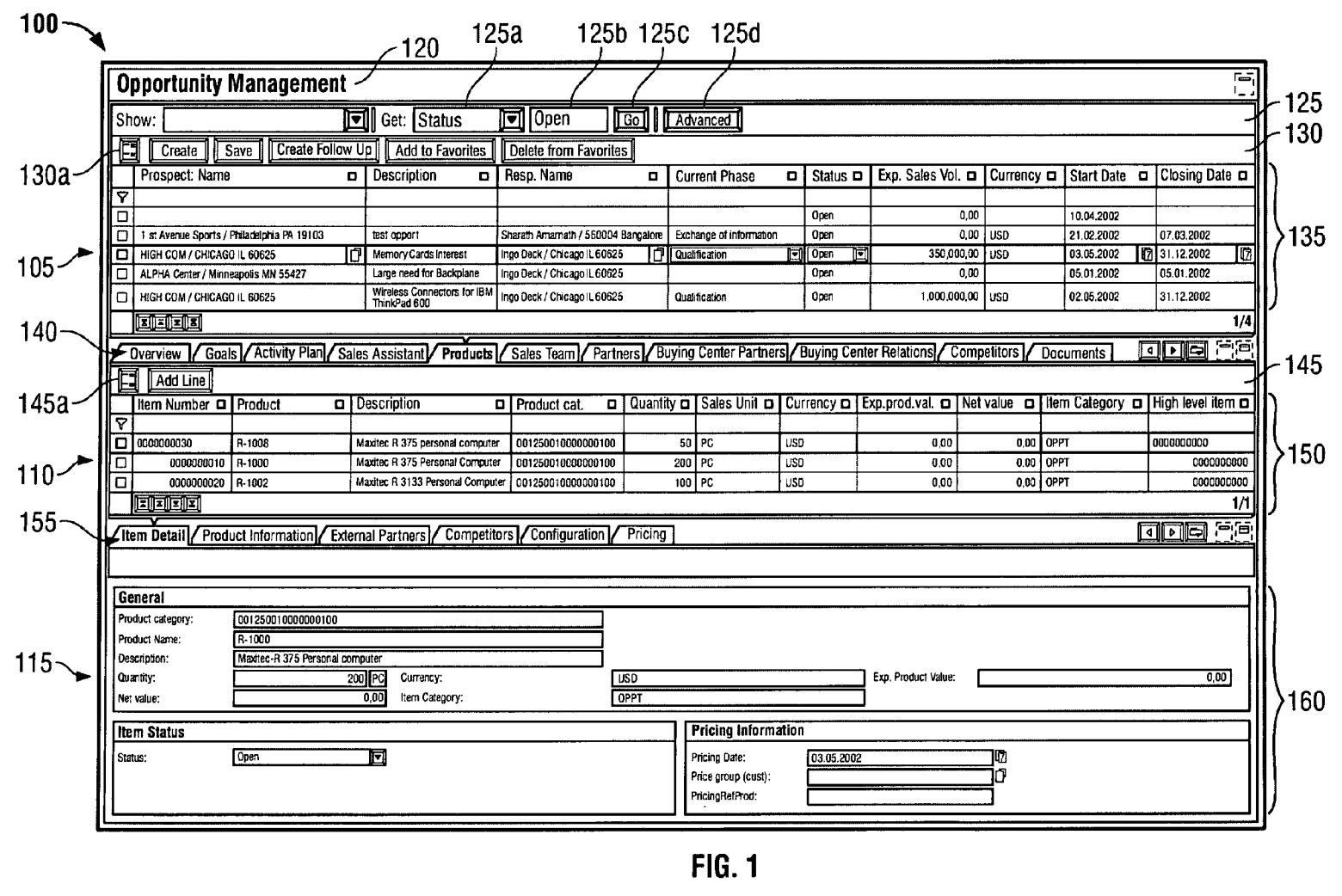
Figure 2:
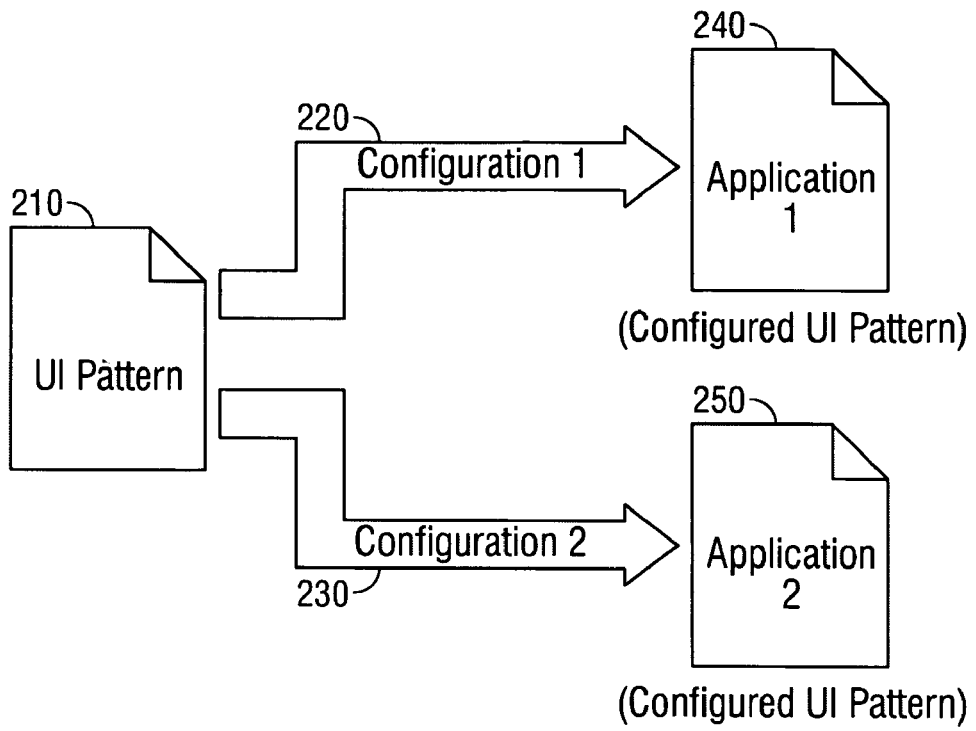
FIG. 2 is a block diagram illustrating the configuration of a UI pattern.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this process might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
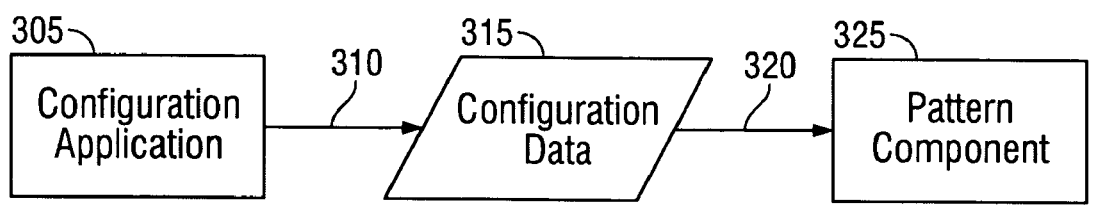
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
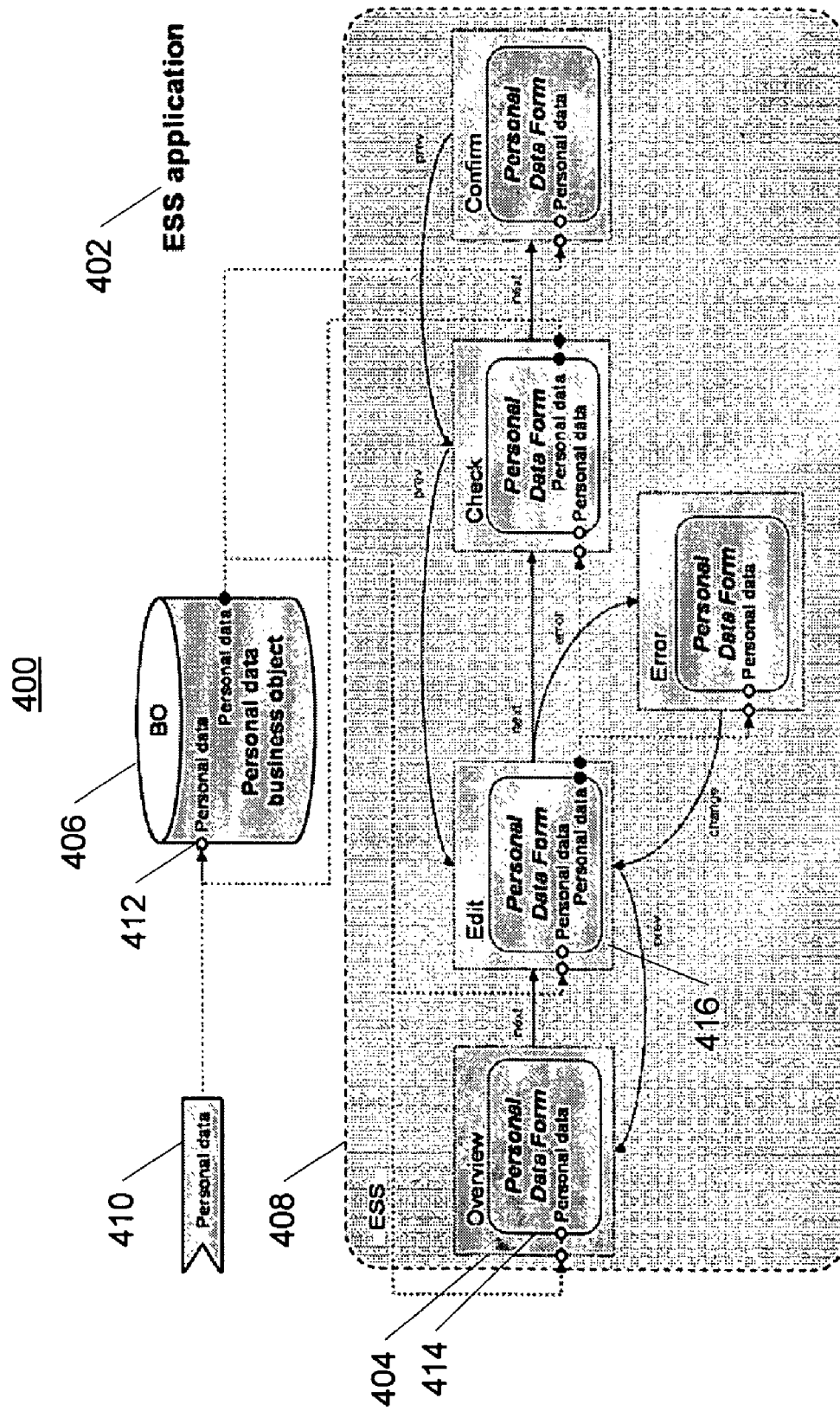
FIG. 4 is an illustration of an application being developed in a visual modeling program.

FIG. 4 is an illustration 400 of an application being developed in a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program by defining graphical representations used for designtime entities in a visual modeling program (e.g., how a pattern, such as an interactor, is represented to an application developer), rules that govern how the graphical representations can be composed and connected (e.g., exact rules for a language syntax for modeling language entities), and a specification that governs how a composition of modeling language entities will be interpreted to generate a runtime version of an application (e.g., an exact specification of semantic rules for how designtime entities should be represented in a runtime version of an application). Thus, the base set of patterns, which can describe how the patterns should be represented, syntax for the patterns, and semantics of those patterns, can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed) (e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed and those entities can have different graphical representations.

Figure 5:
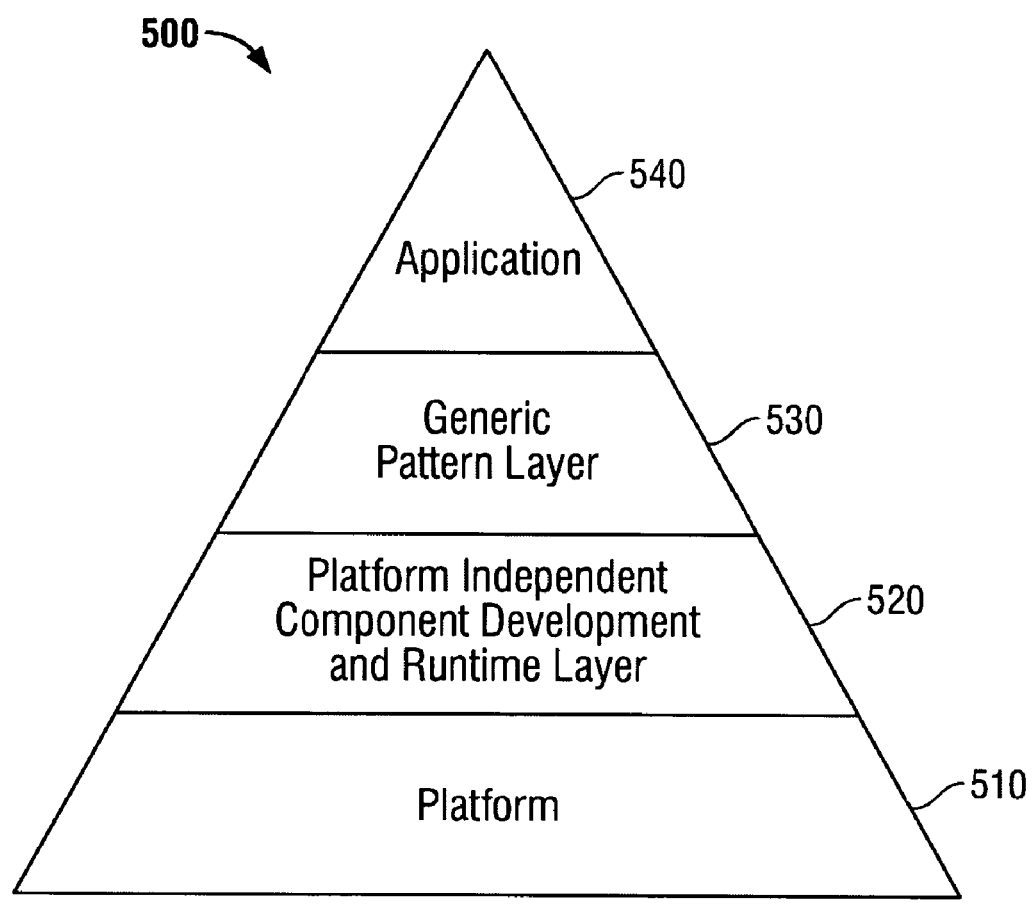
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems and the Advanced Business Application Programming (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides fuctionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Figure 6:
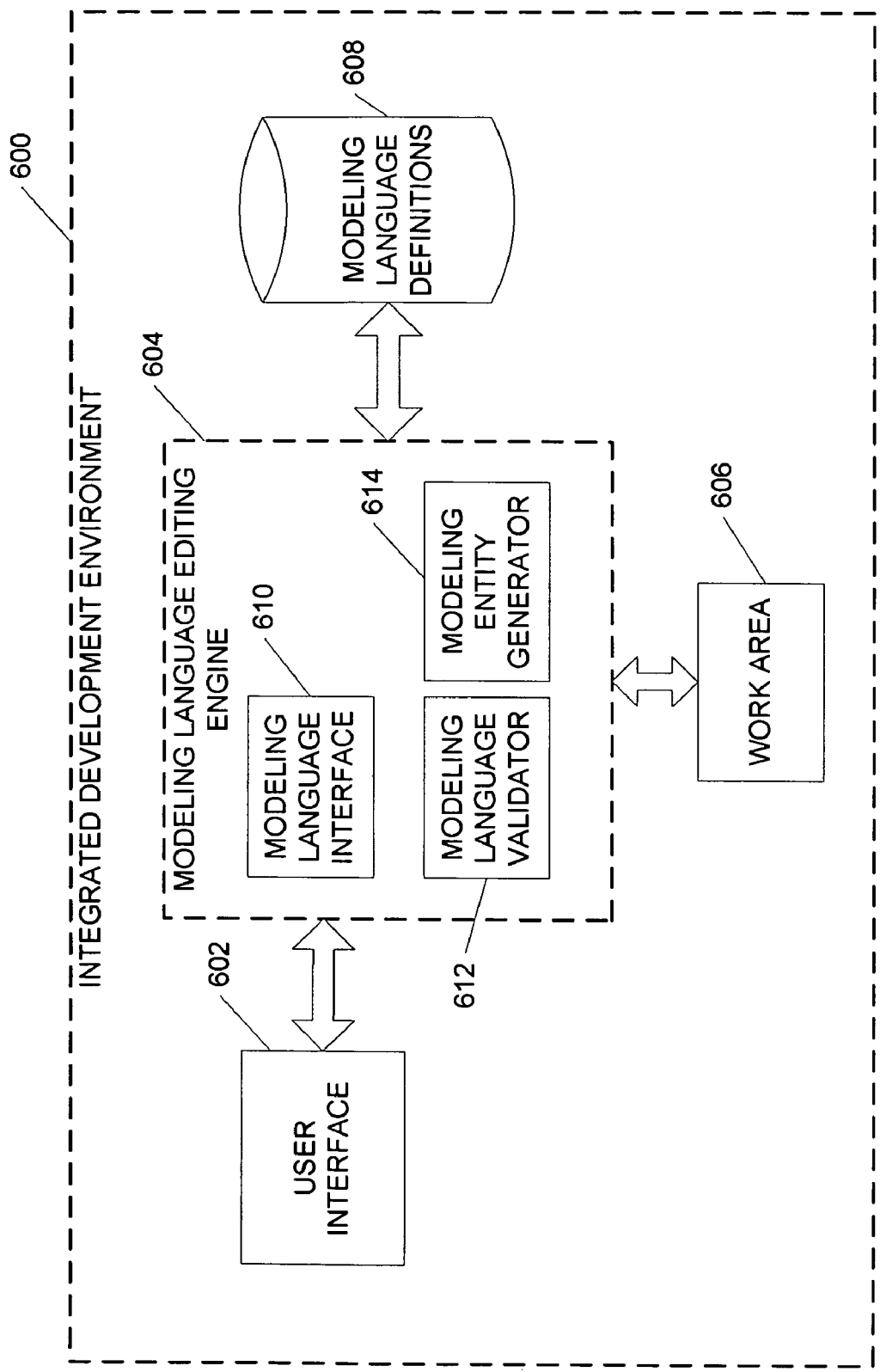
FIG. 6 is a diagram of an integrated development environment for generating extended modeling language entities.

FIG. 6 is a diagram of an integrated development environment 600 for generating extended modeling language entities. In general, extended modeling language entities define modeling language entities of a modeling language in a modeling language environment, such as a visual modeling language environment, and extended modeling entities define extensions to modeling language entities. The extended modeling language entities can be modeling language entities in addition to, or different from, modeling language entities defined in a modeling language by defining new modeling language entities or modifications to existing modeling language entities. For example, an extended modeling language entity can define a new type of scenario in the modeling language discussed with reference to FIG. 4, or a modification of an existing type of scenario. Extensions of modeling language entities can include extensions to graphical representations of entities (e.g., a new graphical representation to be used for a modeling language entity), extensions to a syntax of entities (e.g., a new way in which modeling language entities can be combined to define a different type of relationship between the entities), semantic descriptions of entities (e.g., a different way in which a runtime version of the entities should behave), or any combination of extensions.

Extended modeling language entities generated by the integrated development environment 600 can be part of the generic pattern layer 530 of FIG. 5. Consequently, the extended modeling language entities can be used to define an application in the application layer 540 of FIG. 5.

The integrated development environment 600 includes a user interface 602, a modeling language editing engine 604, a work area 606, and modeling language definitions 608. The user interface 602 is provided in the integrated development environment 600 such that a user can provide input to define extensions to modeling language entities; requests to define and generate extended modeling language entities; and receive output from the integrated development environment 600. The user interface 602 can be a graphical user interface, a command-line interface, or any type of interface, and can include a combination of types of user interfaces. For example, the user interface 602 can include a text editor with which a user can define extensions to modeling language entities in accordance with a programming language used to define modeling language entities. As another example, the user interface 602 can include a graphical user interface that can be used to define extensions to modeling language entities in accordance with the model-view-controller paradigm.

In general, the modeling language editing engine 604 receives definitions of extensions to modeling language entities, validates that the extensions fulfill certain conditions, and generates extended modeling language entities if the extensions fulfill the conditions. To perform these tasks, the modeling language editing engine 604 receives input from the user interface 602 and coordinates generating extended modeling language entities. Input received from the user interface 602 can include requests to define extended modeling language entities, definitions of extensions to modeling language entities, and requests to generate extended modeling language entities. Coordinating generation of extended modeling language entities involves responding to input from the user interface 602, understanding a modeling language with assistance from a modeling language interface 610, validating extensions to a modeling language with assistance from a modeling language validator 612, and causing generation of an extended modeling language entity with assistance from the modeling entity generator 614; however, coordinating generation of extended modeling language entities need not be limited to these tasks, and can include fewer or different tasks.

The modeling language interface 610 can evaluate aspects of a modeling language defined by the modeling language definitions 608 for the modeling language editing engine 604. This can involve interpreting the modeling language definitions 608 to generate a description of the modeling language defined by those definitions such that the description of the modeling language can be understood to satisfy requests about the modeling language or the modeling language can be understood by other components of the integrated development environment 600. For example, the modeling language validator 612 can request the modeling language interface 610 to determine whether a first scenario of a modeling language can be extended, and, if so, what conditions are required. In response to that request, the modeling language interface 610 can interpret the modeling language entity representing the first scenario, interpret modeling language entities on which the first scenario can depend, and determine whether the first scenario can be extended, and, if so, what conditions are defined to be required for the first scenario (e.g., the first scenario can depend on a second scenario, in which case, the first scenario can inherit required conditions for implementation from the second scenario and the modeling language interface 610 can return those conditions to the modeling language validator 612).

The work area 606 can be used by the modeling language editing engine 604 as a workspace for tasks including, but not limited to, interfacing with a modeling language (e.g., generating a description of a modeling language) and storing an extension to a modeling language entity before the extension is used to generate an extended modeling language entity that is part of the modeling language defined in the modeling language definitions 608.

In general, the modeling language validator 612 determines whether a modeling language entity can be extended and, if so, what conditions, if any, need to be fulfilled in an extension of a modeling language entity. The modeling language, defined by the modeling language definitions 608, defines whether an entity can be extended. Determining whether a modeling language entity can be extended can include querying the modeling language interface 610 to request whether a modeling language entity selected in the user interface 602 can be extended. For example, if a user selects a scenario modeling language entity named ScenarioA and requests to extend ScenarioA, the modeling language validator 612 can query the modeling language interface 610 to determine if ScenarioA can be extended. For example, the modeling language can define that extendable modeling language entities have a property that indicates whether a modeling language entity can be extended (e.g., a property named extendable). Thus, that property of a modeling language entity can be queried to determine whether the entity is extendable.

By having a modeling language define whether a modeling language entity can be extended and having the integrated development environment 600 restrict the entities that can be extended, a user of the user interface 602 need not be intimately familiar with a modeling language when attempting to extend modeling language entities in accordance with the modeling language. For example, if a modeling language entity is defined to not be extendable and extending the modeling language entity would cause undesirable results (e.g., a visual modeling language program that interprets the modeling language would not function if a modeling language entity were extended when the entity should not be extended), the integrated development environment 600 could prevent the undesirable results by declining a user request to extend the modeling entity.

The modeling language defined by the modeling language definitions 608 defines conditions for extending a modeling language entity. The conditions can include optional (e.g., suggested) and required conditions. The conditions can define elements that can optionally be implemented for a modeling language entity, or must be defined for a modeling language entity. The elements can include elements required to have a designtime entity, runtime entity, or both, corresponding to the modeling language entity. For example, for a ScenarioA modeling language entity, a modeling language can define a condition that a special runtime generator be implemented for generating runtime versions of extended modeling entities based on ScenarioA. The conditions can define semantic elements, syntactic elements, elements for graphical representations, or any combination of types of elements, that need to be implemented. For example, the conditions can define that an extended modeling language extending an interactor modeling language entity InteractorA have a runtime semantic defined for interacting with a plug defined as PlugA (e.g., responding to input from PlugA).

To determine the conditions, if any, for an extension of a modeling language entity, the modeling language validator 612 can interact with the modeling language interface 610, which can evaluate a modeling language entity defined by the modeling language definitions 608. The modeling language definitions can define the conditions for extending a modeling language entity on an entity-by-entity basis (e.g., a scenario modeling language entity ScenarioA can be extended if conditions A and B are met, but not a scenario modeling language entity ScenarioB), based on a class of entities (e.g., all scenarios can be extended and require a condition A to be met), or using another technique.

The modeling language validator 612 can use different techniques to determine whether an extension fulfills conditions for implementing an extension. As examples, the modeling language validator 612 can parse source code defining an extension and determine if the conditions were described in the extension. Determining whether an extension fulfills conditions need not involve determining qualitative aspects of fulfilling conditions (e.g., whether conditions have been fulfilled properly). For example, the modeling language validator 612 can determine whether a condition has been declared in source code, but, need not check an implementation of an element that corresponds to a condition to ensure it functions properly. For example, if a condition defines that a runtime generator for a modeling language entity need be defined for an extension, the modeling language validator 612 can merely check to ensure that source code attempts to define a runtime generator, and need not determine whether the runtime generator is defined by the source code.

The modeling entity generator 614 generates extended modeling language entities based on a modeling language entity and an extension of the modeling language entity. The generated extended modeling language entities can be added to the modeling language definitions 608, or replace an existing modeling language entity in the modeling language definitions 608. By generating an extended modeling language entity, a definition of a modeling language can be changed. In addition to generating modeling language entities, the modeling entity generator 614 can associate details related to a designtime entity, runtime entity, or both, corresponding to an extended modeling language entity. For example, a new scenario modeling language entity ScenarioA can be associated with a runtime generator for generating runtime versions of ScenarioA and a designtime graphical modeling entity corresponding to ScenarioA.

As mentioned in examples above, the modeling language definitions 608 can include modeling language entities, including extended modeling language entities, that define a modeling language, such as a visual modeling language. The modeling language can be similar to the pattern-based modeling language discussed with reference to FIG. 4, where combinations of patterns are configured to define an application. Thus, the integrated development environment 600 can be a development environment separate from the development environment used to generate applications, and the integrated development environment 600 can define the modeling language of a visual modeling program that is used to define and generate pattern-based applications.

Although FIG. 6 includes an integrated development environment for generating extended modeling language entities, the tools for generating extended modeling language entities need not be part of an integrated development environment. For example, they can be separate tools. Extended modeling language entities can be generated in an architecture that differs from the architecture of the modeling language editing engine 604. For example, the components of the modeling language editing engine 604 need not be included in a single modeling language editing engine. For example, the modeling language interface 610 can be a component separate from the modeling language editing engine 604. As another example, a separate component need not be used to interface with a modeling language and interfacing with a modeling language can be part of tasks performed by other components. For example, the modeling language validator 612 can interpret the modeling language definitions 608 and need not use the assistance of another component. Also, functions of various components of FIG. 6 can vary. For example, the type of input received at a modeling language editing engine 604 can include other types of input.

FIG. 7 is a flowchart 700 illustrating a process of selectively generating an extended modeling language entity. The extended modeling language entity can be used in a visual modeling program used to define applications as a configuration and combination of graphical modeling entities. By generating an extended modeling language entity, the process can be used to extend a modeling language. For example, by defining a new semantic behavior of a modeling language entity as an extension to be included in an extended modeling language entity, a modeling language can be extended.

The process can begin when a request to extend a modeling language entity is received (710). A request to extend a modeling language entity can be received in a development environment, such as an integrated development environment. A request can be in different forms. For example, in a mouse-driven graphical user interface a user can click a button for requesting that a modeling language entity be extended. As another example, a definition of an extension can be submitted, in which case, submitting the definition can be the form of the request. A request need not be in the form of a user request. Following the previous example, a component of an integrated development environment can receive a definition of a request from another component.

A determination is made as to whether support is provided for an extension (720) (e.g., determining whether a visual modeling program should permit (or allow) an extension of a modeling language entity). The determination can involve determining whether support is provided for a specific modeling language entity or a class of modeling language entities. For example, in the modeling language described with reference to FIG. 4, support can be provided for all modeling language entities that are scenarios. Determining whether support is provided can involve evaluating a modeling language. For example, a modeling language can define that for a certain class of modeling language entities support is provided.

If it is determined that support is not provided, support is excluded (730); otherwise, support is provided. For example, if a definition of an extension to a modeling language entity is submitted, and support is not provided, excluding support can include warning a user that the extension can not be added and preventing an extension from becoming part of a modeling language. As another example, in a graphical user interface, excluding support can include disabling a button for defining an extension to a modeling language entity. Providing support can include allowing a user to define an extension of modeling language entity.

A definition of an extension to a modeling language entity is received as input (740). A definition can be received as input in different forms or combinations of forms. For example, in a graphical modeling environment conforming to the model-view-controller paradigm, dragging and dropping elements can be used to define an extension of a modeling language entity that is received as input. As another example, in a text editor, a definition can be described through expressions in accordance with a programming language and the expression in the text editor can be received as input.

A determination is made as to whether the definition meets conditions for an extension (750). This determination can be made in response to a request to generate an extended modeling language entity. This determination can involve determining the conditions for an extension and determining whether those conditions are fulfilled. The conditions for an extension can define elements that need to be implemented for an extension of a modeling language entity. For example, for an interactor modeling language entity InteractorA, a condition can define that a behavior has to be defined to respond to an input. That condition could be fulfilled if the behavior is implemented. For example, if source code defines a behavior to be performed in response to input, the condition can be considered fulfilled. There can be any number of conditions that need to be met for a definition of an extension. In some implementations, not all conditions need be fulfilled for an extension. For example, some conditions can depend on other conditions, in which case, a user can choose which conditions to fulfill and others need not be fulfilled.

If the conditions (e.g., conditions that need be implemented) are not met, further definition of an extension can be received as input (740). Otherwise, if the conditions are met, an extended modeling language entity is generated (760). This determination can be made by an integrated development environment, or another mechanism. By having a mechanism determine whether conditions are met for an extension, that mechanism can prevent extensions from being generated where the extensions have not been fully implemented. Thus, a development environment can ensure that extensions are properly implemented. Also, a user need not be concerned with forgetting to implement aspects of an extension that need to be implemented, as the development environment can prevent the user from forgetting to implement aspects and, in some implementations, the development environment can notify a user of aspects that need to be implemented.

Generating an extended modeling language entity can involve updating a definition of a modeling language to include the extended modeling language entity as part of the definition of the modeling language. In addition, generating an extended modeling language entity can involve generating corresponding designtime and runtime entities.

Implementations of the process in flowchart 700 can involve the use of a wizard for generating extended modeling language entities. The wizard can be implemented in a development environment that uses a graphical user interface that has a graphical depiction of modeling language entities of a modeling language. Requesting to extend a modeling language entity (710), determining whether support can be provided (720), and providing support (740-760) or excluding support (730) can be implemented using different mechanisms or techniques. For example, a request to extend a modeling language entity can be received when a user selects a modeling language entity with a mouse and selects an option, from a context menu, to generate an extended modeling language entity. As another example, a wizard can be started and a list of modeling language entities that can be extended can be provided to a user. In that example, excluding support can include excluding a modeling language entity from the list of modeling language entities.

After a wizard has started, the wizard can provide a template of conditions that are to be fulfilled to implement the extension. For example, the wizard can generate a default definition of an extension as a piece of source code, with portions of the source code left blank where elements need to be implemented. A user can edit the template to provide a definition of an extension, and the definition can be used to generate an extended modeling language entity.

The subject matter described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including method steps, can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter of this specification can be implemented in a computing system that includes a back-end component (e.g., a data server), a middleware component (e.g., an application server), or a front-end component (e.g., a client computer having a graphical user interface or a web browser through which a user can interact with an implementation of the subject matter disclosed in this specification), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, the operations can differ and still achieve desirable results. In certain implementations, multitasking and parallel processing may be preferable. Other embodiments are within the scope of the following claims

What is claimed is:

1. A computer-implemented method comprising:
   selecting, on at least one computer, a plurality of patterns in a visual modeling environment and establishing connections between the plurality of patterns to create a design time graphical representation of one or more user interfaces of an end-user application, wherein each pattern performs one or more user interface tasks and different patterns performing different user interface tasks have different graphical representations, and wherein at least a first pattern of the plurality of patterns has a visual representation in the end-user application and at least a second pattern of the plurality of patterns does not have a visual representation in the end-user application, and wherein the plurality of patterns in the visual modeling environment further comprise syntax rules governing how the patterns can be composed and semantic rules governing how the patterns will be interpreted to generate the runtime version of the end-user application;
   configuring the plurality of patterns to specify application specific properties of each pattern to produce configuration data, the configuration data defining the behavior of the one or more user interfaces in the end-user application, wherein configuring the second pattern not having a visual representation in the end-user application comprises specifying a back-end system and data to be used by the second pattern;
   storing the configuration data in a repository;
   receiving user input defining an extension to at least one pattern, wherein a first pattern in the plurality of patterns has a property that indicates whether or not the first pattern is extendable, and querying the first pattern to determine whether the first pattern is extendable; and
   generating a runtime version of the end-user application using the configuration data.

2. The method of claim 1 wherein the configuration data specifies a particular service to use to access data from the back-end system to be used by the second pattern.

3. The method of claim 1 wherein the configuration data comprises references to the plurality of patterns.

4. The method of claim 1 wherein each pattern, before configuration, comprises first properties, and wherein each pattern, after configuration, comprises second properties in addition to the first properties, and wherein the second properties are specific to the end-user application.

5. The method of claim 4 further comprising:
   selecting the plurality of patterns in the visual modeling environment and establishing second connections between the plurality of patterns to create a second design time graphical representation of one or more user interfaces of a second end-user application;
   configuring the plurality of patterns to specify second application specific properties of each pattern to produce second configuration data, wherein each pattern, after configuration, comprises third properties in addition to the first properties, and wherein the third properties are specific to the second end-user application;
   storing the second configuration data in a repository; and
   generating a runtime version of the second end-user application using the second configuration data.

6. The method of claim 4 wherein the first properties include the location of a table in a first user interface, and wherein the second properties include specific columns to be included in the table when the table is rendered in the first user interface.

7. The method of claim 1 wherein the unconfigured patterns are reusable in different end-user applications and the configured patterns are reusable in different end-user applications.

8. The method of claim 1 wherein the configuration data comprises associations between one or more user interface elements in a pattern and one or more entities of a back-end system to be used with a particular user interface element.

9. The method of claim 1 wherein the configuration data comprises:
   a specification of the back-end system;
   a query to be run in the back-end system;
   query fields to display in a drop down box; and
   result fields to display.

10. The method of claim 1 wherein different patterns have different syntax and semantics.

11. A computer program product tangibly embodied in a machine-readable storage device, the computer program product executing a method comprising:
    selecting, on at least one computer, a plurality of patterns in a visual modeling environment and establishing connections between the plurality of patterns to create a design time graphical representation of one or more user interfaces of an end-user application, wherein each pattern performs one or more user interface tasks and different patterns performing different user interface tasks have different graphical representations, and wherein at least a first pattern of the plurality of patterns has a visual representation in the end-user application and at least a second pattern of the plurality of patterns does not have a visual representation in the end-user application, and wherein the plurality of patterns in the visual modeling environment further comprise syntax rules governing how the patterns can be composed and semantic rules governing how the patterns will be interpreted to generate the runtime version of the end-user application;

configuring the plurality of patterns to specify application specific properties of each pattern to produce configuration data, the configuration data defining the behavior of the one or more user interfaces in the end-user application, wherein configuring the second pattern not having a visual representation in the end-user application comprises specifying a back-end system and data to be used by the second pattern;

storing the configuration data in a repository;

receiving user input defining an extension to at least one pattern, wherein a first pattern in the plurality of patterns has a property that indicates whether or not the first pattern is extendable, and querying the first pattern to determine whether the first pattern is extendable; and generating a runtime version of the end-user application using the configuration data.

12. The computer program product of claim 11 wherein the configuration data specifies a particular service to use to access data from the back-end system to be used by the second pattern.

13. The computer program product of claim 11 wherein the configuration data comprises references to the plurality of patterns.

14. The computer program product of claim 11 wherein each pattern, before configuration, comprises first properties, and wherein each pattern, after configuration, comprises second properties in addition to the first properties, and wherein the second properties are specific to the end-user application.

15. The computer program product of claim 14 further comprising:

selecting the plurality of patterns in the visual modeling environment and establishing second connections between the plurality of patterns to create a second design time graphical representation of one or more user interfaces of a second end-user application;

configuring the plurality of patterns to specify second application specific properties of each pattern to produce second configuration data, wherein each pattern, after configuration, comprises third properties in addition to the first properties, and wherein the third properties are specific to the second end-user application;

storing the second configuration data in a repository; and generating a runtime version of the second end-user application using the second configuration data.

16. The computer program product of claim 14 wherein the first properties include the location of a table in a first user interface, and wherein the second properties include specific columns to be included in the table when the table is rendered in the first user interface.

17. The computer program product of claim 11 wherein the unconfigured patterns are reusable in different end-user applications and the configured patterns are reusable in different end-user applications.

18. The computer program product of claim 11 wherein the configuration data comprises associations between one or more user interface elements in a pattern and one or more entities of a back-end system to be used with a particular user interface element.

19. The computer program product of claim 11 wherein the configuration data comprises:

a specification of the back-end system;

a query to be run in the back-end system;

query fields to display in a drop down box; and result fields to display.

20. The computer program product of claim 11 wherein different patterns have different syntax and semantics.

21. A system comprising:

one or more computers; and a computer program, the computer program, when executed, performing the following steps:

selecting, on at least one computer, a plurality of patterns in a visual modeling environment and establishing connections between the plurality of patterns to create a design time graphical representation of one or more user interfaces of an end-user application, wherein each pattern performs one or more user interface tasks and different patterns performing different user interface tasks have different graphical representations, and wherein at least a first pattern of the plurality of patterns has a visual representation in the end-user application and at least a second pattern of the plurality of patterns does not have a visual representation in the end-user application, and wherein the plurality of patterns in the visual modeling environment further comprise syntax rules governing how the patterns can be composed and semantic rules governing how the patterns will be interpreted to generate the runtime version of the end-user application;

configuring the plurality of patterns to specify application specific properties of each pattern to produce configuration data, the configuration data defining the behavior of the one or more user interfaces in the end-user application, wherein configuring the second pattern not having a visual representation in the end-user application comprises specifying a back-end system and data to be used by the second pattern;

storing the configuration data in a repository;

receiving user input defining an extension to at least one pattern, wherein a first pattern in the plurality of patterns has a property that indicates whether or not the first pattern is extendable, and querying the first pattern to determine whether the first pattern is extendable; and generating a runtime version of the end-user application using the configuration data.

22. The system of claim 21 wherein the configuration data specifies a particular service to use to access data from the back-end system to be used by the second pattern.

23. The system of claim 21 wherein the configuration data comprises references to the plurality of patterns.

24. The system of claim 21 wherein each pattern, before configuration, comprises first properties, and wherein each pattern, after configuration, comprises second properties in addition to the first properties, and wherein the second properties are specific to the end-user application.

25. The system of claim 24 further comprising:

selecting the plurality of patterns in the visual modeling environment and establishing second connections between the plurality of patterns to create a second design time graphical representation of one or more user interfaces of a second end-user application;

configuring the plurality of patterns to specify second application specific properties of each pattern to produce second configuration data, wherein each pattern, after configuration, comprises third properties in addition to the first properties, and wherein the third properties are specific to the second end-user application;

storing the second configuration data in a repository; and generating a runtime version of the second end-user application using the second configuration data.

26. The system of claim 24 wherein the first properties include the location of a table in a first user interface, and wherein the second properties include specific columns to be included in the table when the table is rendered in the first user interface.

27. The system of claim 21 wherein the unconfigured patterns are reusable in different end-user applications and the configured patterns are reusable in different end-user applications.

28. The system of claim 21 wherein the configuration data comprises associations between one or more user interface elements in a pattern and one or more entities of a back-end system to be used with a particular user interface element.

29. The system of claim 21 wherein the configuration data comprises:

a specification of the back-end system;

a query to be run in the back-end system;

query fields to display in a drop down box; and result fields to display.

30. The system of claim 21 wherein different patterns have different syntax and semantics.

* * * * *